United States Patent [19]
Ogiso et al.

[11] 3,853,396
[45] Dec. 10, 1974

[54] CONTINUOUS PHOTOGRAPHING CAMERA WHICH CAN BE DRIVEN WITH HIGH SPEED BY AN AUXILIARY POWER SOURCE

[75] Inventors: Mitsutoshi Ogiso, Kawasaki; Hiroshi Aizawa, Tokyo; Susumu Kozuki, Kawasaki, all of Japan

[73] Assignee: Canon Kabushiki Kaisha, Tokyo, Japan

[22] Filed: Sept. 6, 1973

[21] Appl. No.: 394,573

[30] Foreign Application Priority Data
Sept. 6, 1972 Japan.......................47-103738

[52] U.S. Cl................. 354/173, 354/212, 242/71.5
[51] Int. Cl........................ G03b 1/12, G03b 19/04
[58] Field of Search........... 95/31 EL, 31 AC, 11 R, 95/31 R; 352/121; 242/71.5

[56] References Cited
UNITED STATES PATENTS
| 3,528,352 | 9/1970 | Ikegami | 95/31 EL |
| 3,587,425 | 6/1971 | Biber | 95/11 R |

FOREIGN PATENTS OR APPLICATIONS
| 596,380 | 7/1959 | Italy | 95/31 EL |
| 1,300,006 | 7/1969 | Germany | 95/31 EL |

Primary Examiner—Robert P. Greiner
Attorney, Agent, or Firm—McGlew and Tuttle

[57] ABSTRACT

The camera body contains an electric motor connected, in a supply circuit, to a built-in source of power such as a battery. A switch is included in the supply circuit and is operated by the release button to energize the motor to perform various operations such as film wind-up, shutter charging and release, and the like. A second and normally closed switch is included in the supply circuit and is opened by an operator projecting to the exterior of the camera body. A pair of exteriorly exposed terminals are connected to respective opposite ends of the normally closed switch. An auxiliary unit, for high speed operation of the camera, contains a built-in source of power, such as an electric battery, and has respective contacts engaging with the terminals of the camera body responsive to mounting of the auxiliary unit on the camera body by means of releasable latch means. The auxiliary unit has an abutment engageable with the operator of the normally closed switch to open the latter responsive to mounting of the auxiliary unit on the camera body and before the contacts of the auxiliary unit engage the terminals of the camera body. The battery is connected in circuit with the contacts of the auxiliary unit through a normally open switch which is closed by inward movement of one contact responsive to mounting of the auxiliary unit on the camera body. Thereby, when the auxiliary unit is mounted on the camera body, the two batteries are connected in series in the motor drive circuit and, when the auxiliary unit is dismounted from the camera body, the normally open switch in the auxiliary unit is opened responsive to such dismounting.

5 Claims, 1 Drawing Figure

PATENTED DEC 10 1974 3,853,396
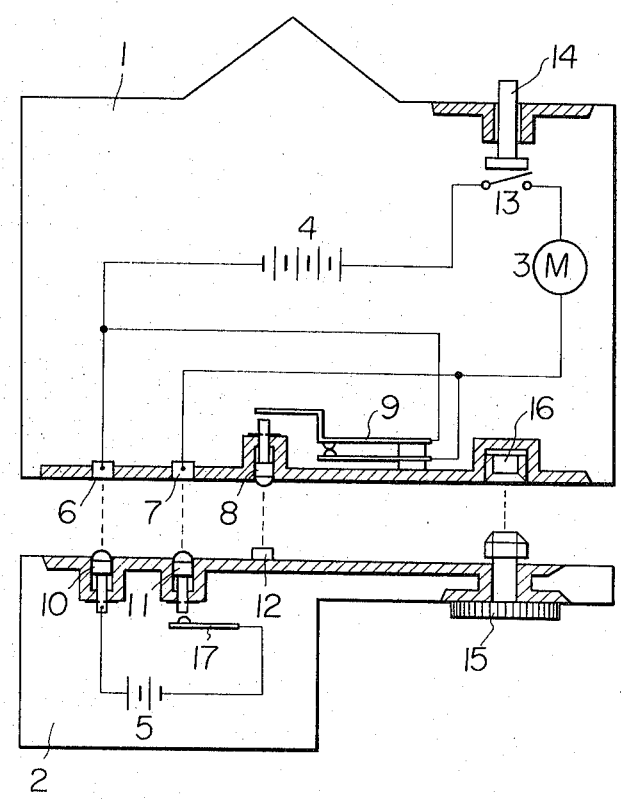

CONTINUOUS PHOTOGRAPHING CAMERA WHICH CAN BE DRIVEN WITH HIGH SPEED BY AN AUXILIARY POWER SOURCE

BACKGROUND OF THE INVENTION

1. Field of the Invention

The present invention relates to a still camera having a continuous driving device for performing various operations, such as shutter charging and release, film winding, and the like, and which can be operated at high speed by disengageably mounting, on the camera body, a supplementary source of electric power which, responsive to such mounting, is connected in series with a built in source of electric power in the camera body.

2. Description of the Prior Art

In a still camera having a continuous driving device it is necessary that a driving device for shutter, etc. has high speed exposing a large number of photographing frames per second, and this has been done hitherto by changing over a power source, built in the device, to high voltage. In such known high speed driving, a high voltage power source is always built in a camera. However, since it is only at special occasions that high speed photographing is require, it is not advantageous to have such high voltage power source built in in the camera from the standpoint of weight and carrying and handling.

SUMMARY OF THE INVENTION

An object of the present invention is to eliminate the above mentioned shortcomings.

Another object of the present invention is to provide a continuously electrically driven camera operable at high speed by merely attaching an auxiliary power source to the exterior of a continuous photographing camera.

Further, objects of the present invention will become clear from a concrete example of the present invention which will be explained in detail below.

BRIEF DESCRIPTION OF THE DRAWINGS

In the drawing, the single FIGURE is an elevation view, partly in section, and with certain electrical circuitry illustrated schematically, of one embodiment of the invention.

DESCRIPTION OF THE PREFERRED EMBODIMENT

An embodiment of the present invention will be explained referring to the drawing. In the drawing, 1 is a main body of a still camera having a continuous driving device and 2 is an auxiliary power source unit, with continuous photographing being done normally using only camera main body 1. Main body 1 has mounted therein an electric motor 3 for powering various camera functions such as, for example, shutter charging and release, film winding, etc. A battery 4 in main body 1 constitutes a built-in power source, and a battery 5 in unit 2 constitutes an auxiliary power source. Connecting terminals 6 and 7, as well as a push button 8, as shown in the drawing, are provided at, for example, the bottom of the camera main body 1 constituted by an insulating base plate. Connecting terminals 10, 11 and a protruding part 12 are provided at positions in the auxiliary power source unit 2 corresponding to the above mentioned terminals 10, 11 and the push button 8 on the camera main body 1. The camera main body 1 and the auxiliary power source unit 2 can be disengageably coupled to each other by, for example, a tripod attaching threaded socket on body 1 16 and an attaching screw 15 on unit 2. A normally closed switch 9 which is openable by the push button 8 is provided within the camera main body 1, so that, as the auxiliary power source unit 2 is attached to the camera main body 1, the push button 8 is pushed in by the protruding part 12 to open the normally open switch 9. The switch 13 is closable by the release button 14 of the camera. A switch 17 is provided at the terminal 11 in the auxiliary power source unit 2 in order to open the circuit including auxiliary power source 5 when the unit 2 is removed from the camera main body 1.

In the ordinary photographing in which the high speed driving is not required in the device shown in the drawing, auxiliary power source unit 2 is uncoupled from camera main body 1 and continuous photographing is done only with the camera main body 1. At this time the switch 9 is in ON state and power is supplied to the driving motor 3 from the built-in power source 4. Next, as the auxiliary power source unit 2 is coupled to the camera main body 1 by threading attaching screw 15 into socket 16, first the push button 8 is pushed in by the protruding part 12, placing the switch 9 in OFF state. Then the terminals 10, 11 of the unit 2 come in contact with the terminals 6, 7 respectively at the camera side, and the terminals 10, 11 of the unit 2 are pushed in placing the switch 17 in ON state, so that the auxiliary power source 5 is connected in series with the built-in power source 4 such. Therefore such high voltage will be supplied to the motor 3 by adding the voltage of the power source 4 and that of the power soure 5 together, so that high speed driving can be done. As has been explained above, since the device has a structure such that the switch 9 becomes OFF before the terminals 10, 11 of the auxiliary power source unit are connected to the power source 5 by the switch 17, no short-circuiting of the auxiliary power source thereby will take place. Also the switch 17 is provided so that no short-circuiting will take place between the terminals 10, 11 even if they have a structure such that the terminals project from the unit 2.

As has been explained above, a camera which is electrically driven in a continuous manner at high speed can be provided simply by disengageably coupling an auxiliary power source unit to a camera, in the device of the present invention. Thus the main body of a camera can be made to have a small size and light weight, so that a device which is advantageous in various kinds of photographing can be obtained.

What is claimed is:

1. An electric driving system, for a still camera including walls forming a camera main body, comprising, in combination, a main electric power source mounted in said main body; motor operated driving means in said body operable, when connected to said source, to perform functions of the camera including film wind-up and shutter charging and release; a normally closed switch means in said main body in series in a supply circuit connecting said driving means to said source; a pair of first terminals, on a wall of said body, connected to respective opposite ends of said switch means; and an auxiliary power source device including a casing constructed for disengageable coupling to said body wall carrying said first terminals, an auxiliary power source in said casing and a pair of second terminals on said casing connected to respective opposite terminals of said auxiliary power source and each engageable with a respective first terminal upon coupling of said casing to said body; said normally closed switch means being opened responsive to coupling of said casing to said body whereby said main and auxiliary power sources are connected in series with each other responsive to such coupling.

2. An electric driving system for a still camera, as claimed in claim 1, including a normally open switch means in said casing connected between one second terminal and said auxiliary power source and closed responsive to coupling of said casing to said body and opened responsive to uncoupling of said casing from said body.

3. An electric driving system for a still camera, as claimed in claim 1, in which said normally closed switch means includes a fixed contact and a movable contact; a member slidably mounted in the body wall carrying said first terminals to project somewhat therefrom; said member being aligned with said movable contact and normally occupying a first position out of engagement with said movable contact; said member, responsive to coupling of said casing to said body, being moved to a second position engaging said movable contact and disengaging said movable contact from said fixed contact.

4. An electric driving system for a still camera, as claimed in claim 3, including an abutment on said casing engageable with said member to displace said member to said second position responsive to coupling of said casing to said body.

5. An electric driving system for a still camera, as claimed in claim 2, in which said normally open switch means comprises a fixed contact and said one second terminal; said one second terminal being slidably mounted in said casing for movement between a normal first position in which it is out of engagement with said fixed contact of said normally open switch and a second position in which it engages said fixed contact of said normally open switch; said one second terminal being moved to said second position responsive to coupling of said casing to said body.

* * * * *